May 27, 1969 J. G. ATTWOOD ET AL 3,447,051
CONTROL CIRCUIT FOR ELECTROMECHANICAL DEVICES
Filed Jan. 13, 1965 Sheet 1 of 3

United States Patent Office 3,447,051
Patented May 27, 1969

3,447,051
CONTROL CIRCUIT FOR ELECTRO-
MECHANICAL DEVICES
John G. Attwood, Oak Park, and Robert L. Kosrow, Elk
Grove Village, Ill., assignors to Union Special Machine
Company, Chicago, Ill., a corporation of Illinois
Filed Jan. 13, 1965, Ser. No. 425,230
Int. Cl. H03g 11/00; H01v 7/00, 9/00
U.S. Cl. 318—127                                 18 Claims

ABSTRACT OF THE DISCLOSURE

A control circuit for an ultrasonic sealing tool which is effective to maintain the amplitude of vibration of the tool at a predetermined constant value irrespective of variations in the applied mechanical loading. The circuit includes a detector responsive to a difference in phase between constant amplitude current and voltage signals to also maintain the frequency of the tool constant under varying loading conditions.

---

Figure 1:
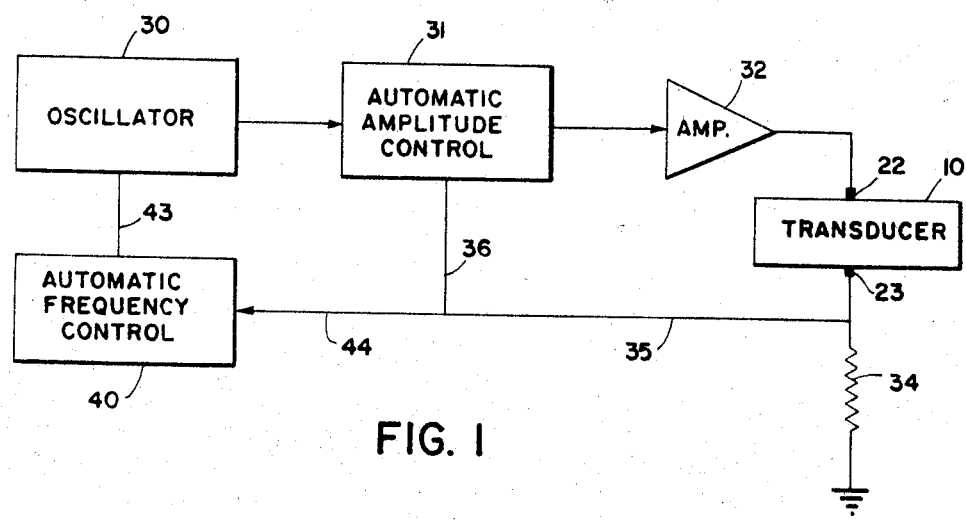

This invention relates to a control circuit for an electromechanical vibratory device and more particularly to a circuit for controlling the vibratory motion of a device for bonding together pieces of material.

In the joining of thermoplastic sheet material, for example, through the use of ultrasonic tehcniques, the material to be joined customarily is inserted between a stationary member and one end of an elongated vibratory device having a natural mechanical resonant frequency within the ultrasonic range. The vibratory device is supplied with alternating current of corresponding frequency to produce mechanical vibrations of the compressional wave energy type. A portion of these vibrations is reflected by boundaries such as interfaces to form standing wave patterns having one or more zones or nodes of minimum motion at one-half wavelength intervals and other zones or antinodes of maximum motion at distances of one-quarter wavelength from an adjacent node. The device advantageously is supported at a node, and its longitudinal dimension is such that the end adjacent the material being joined terminates at an antinode to provide vibrations of maximum amplitude. As the pieces of material are advanced between the vibrating end of the device and the stationary member, they are welded together to form a continuous and uniform seam.

In resonant systems of the foregoing type, the amplitude of the electromechanical vibratory device preferably should remain constant irrespective of the load applied to the device. During the seaming operation, however, the resistance of the pieces of material being joined produces a tendency to hold the amplitude of the vibrations at a reduced level, and upon the removal of the material the amplitude tends to increase substantially. As an illustration, if the device is set to vibrate at an amplitude of .005 inch, for example, during the formation of the seam, at the end of the operation after the material has been removed and the pressure against the device is reduced, the amplitude will increase, if uncontrolled, to perhaps .010 inch or .015 inch. The increase in amplitude often results in damage to the electrical connections leading to the device or to the device itself.

This difficulty for the most part has been avoided heretofore by maintaining the amplitude of the vibratory device sufficiently low so that the increase in amplitude as the material is withdrawn is insufficient to damage the equipment. However, the low amplitude has the effect of sacrificing power input and often necessitates the formation of the seam at a comparatively slow rate of speed.

It also is desirable, in electromechanical vibratory devices of the type to which the present invention is directed, to match the frequency of the applied signal to the device's natural resonant frequency, to thereby maintain the system in resonance at all times. However, during the formation of the seam the increased load applied to the device produces changes in its resonant frequency, while the frequency of the alternating current supply remains the same. Although attempts have been made heretofore to alleviate this difficulty by comparing the phase relationship between the applied current and the supply voltage to produce a corrective signal, such attempts were deficient in several respects and particularly because the current and voltage often tended to vary widely in amplitude, thus upsetting the accuracy of the correction. As a result, the frequency of the supply did not match the natural resonant frequency of the device under all conditions, and the power and efficiency of the system were further impaired.

One general object of this invention, therefore, is to provide a new and improved control circuit for an electromechanical vibratory device.

More specifically, it is an object of the invention to provide such control circuit in which the amplitude of the device is maintained at a predetermined constant value irrespective of the applied loading.

Another object of the invention is to provide a control circuit of the character indicated in which the frequency of the alternating current source is continuously readjusted to conform to the natural resonant frequency of the device.

A further object of the invention is to provide a control circuit for an ultrasonic seaming device which enables the rapid and straightforward reduction of the ultrasonic vibrations to an intermediate level during the time the material to be joined is placed in position while at the same time maintaining the various circuit elements in an active condition.

Still another object of the invention is to provide a control circuit for an electromechanical vibratory device which utilizes comparatively simple electrical components and is economical to manufacture and thoroughly reliable in operation.

In one illustrative embodiment of the invention, there is provided a control circuit for an electromechanical vibratory device the amplitude and natural resonant frequency of which exhibit a tendency to vary when loading is applied. The system includes a source of alternating current at ultrasonic frequency and unique circuit means for applying current from the source to the device. Upon the application of loading, an variations in the amplitude of the vibrations are detected by detecting the changes in the applied current which result from the loading. The differences in phase between the applied current and the source voltage during loading also are detected, and a feedback signal is produced which continuously readjusts the frequency of the source to maintain the device in resonance at all times.

In accordance with one feature of the invention, the circuit means is coupled to the amplitude detection circuit and is effective to continuously correct the applied current to maintain it at a predetermined constant value. The amplitude is proportional to this current and remains the same irrespective of the applied loading.

In accordance with another feature of the invention, in several particularly advantageous embodiments, the phase detection circuit is supplied with current and voltage signals which are maintained at constant amplitudes irrespective of the degree of loading. As a result, the adverse effect of variations in these signals which might otherwise be produced as loading is applied is eliminated, and the source frequency is accurately adjusted to equal the natural resonant frequency of the device.

In accordance with still another feature of certain embodiments of the invention, there is provided a manually controlled switching circuit which enables the operator of the device to reduce its amplitude to an intermediate level, to facilitate insertion of the material to be joined, etc., while at the same time maintaining both the amplitude and phase detection circuits in an active condition.

Figure 3:
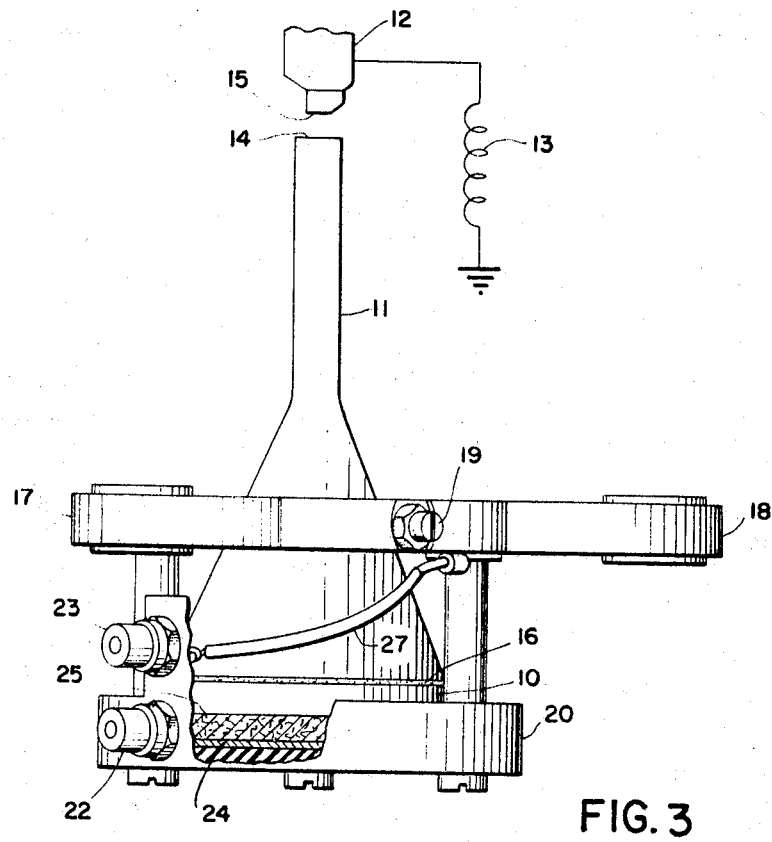
Figure 2:
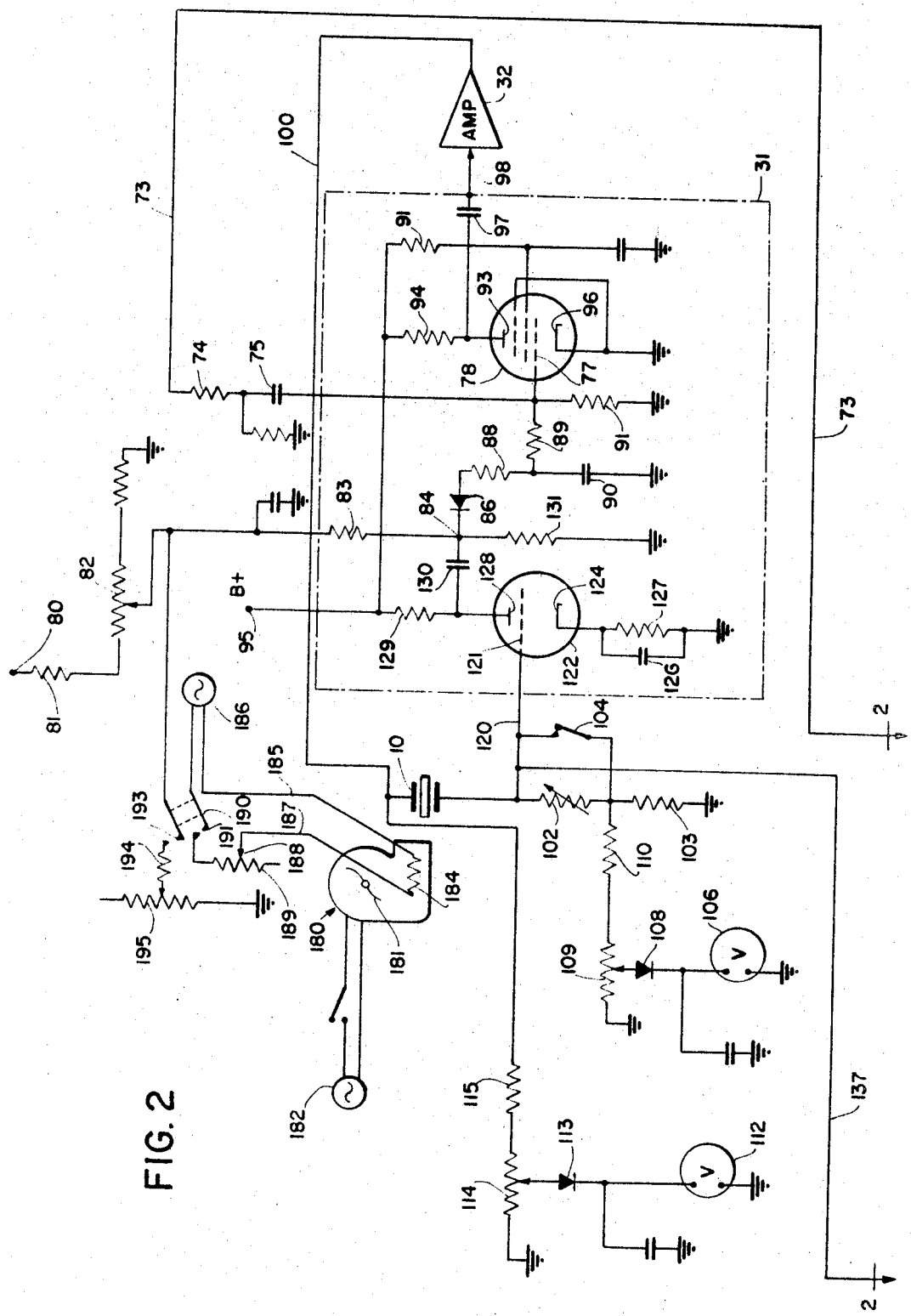
Figure 2A:
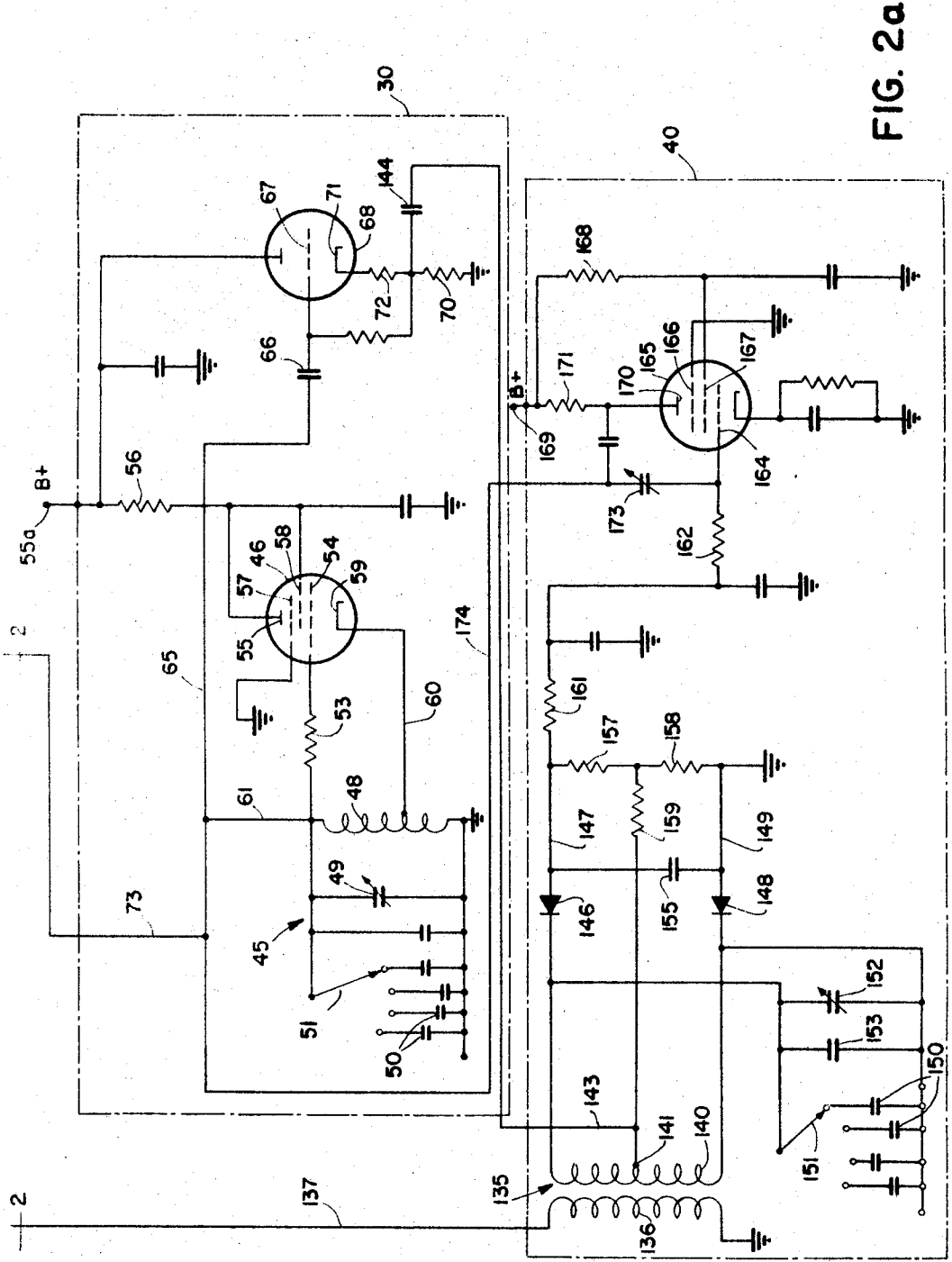

The present invention, as well as further objects and features thereof, will be understood more clearly and fully from the following description of a preferred embodiment thereof, when read with reference to the accompanying drawings, in which:

FIGURE 1 is a schematic block diagram of a control circuit for an electromechanical vibratory device constructed in accordance with a preferred embodiment of the invention;

FIGURES 2 and 2a, when joined along the line 2—2, show a schematic wiring diagram for the control circuit of FIGURE 1; and FIGURE 3 is a fragmentary side view, with certain portions broken away and in section, of an illustrative vibratory device controlled by the circuit of FIGURE 1.

Referring to the drawings, there is shown a control circuit for an electromechanical vibratory device which includes a transducer element indicated generally at 10. Although in some embodiments of the invention magnetostrictive-type transducers are employed with good effect, in the illustrated embodiment the transducer 10 advantageously comprises a piezoelectric crystal of generally disc-shaped configuration. As is well known, the transducer is effective to produce periodic mechanical oscillations of ultrasonic frequency upon the application of electrical energy of corresponding frequency thereto.

As best shown in FIGURE 3, the electromechanical vibratory device comprises an ultrasonic seaming tool 11 which is maintained in spaced relationship with a stationary jaw member 12 to form a gap therebetween for the insertion of the pieces of material to be joined. The jaw member 12 preferably is connected to ground through a coil 13. The tool 11 is of elongated, generally tapered configuration and is provided at its smaller end with a substantially flat surface 14 in juxtaposition with an adjacent surface 15 of the jaw 12. The opposite end of the tool is bonded to the upper face of the transducer 10 by a suitable adhesive 16, such as epoxy cement, for example, which is provided with silver granules distributed therein to facilitate the transmission of electrical energy to the tool.

The tool 11 is dimensioned to vibrate at a natural mechanical resonant frequency which lies within the range of from about 20,000 cycles per second to about 60,000 cycles per second and in some cases from about 20,000 cycles per second to about 30,000 cycles per second. The reflection of a portion of the vibrations from the boundaries of the tool produces standing wave patterns having an antinode which vibrates at maximum amplitude adjacent the tool's smaller upper end. This antinode is spaced one-quarter wavelength above a node, located intermediate the ends of the tool, which exhibits little or no vibratory motion. The tool is supported at the node by a support unit 17 which includes an electrically conductive horizontal plate 18 of generally annular configuration. The plate 18 is provided with a plurality of pointed screws 19 (only one of the screws 19 being visible in FIGURE 3) which bite into the side of the tool at the node and thereby provide a rigid support therefor without substantial effect on the tool's vibratory movement. The support unit 17 also includes a base member 20 suspended from the plate 18, and this base member carries a pair of jacks 22 and 23. The jack 22 is maintained in electrically conductive relationship with the lower face of the transducer 10 by means of a flat brass disc 24 resting on the base member 20 and a resilient wire mesh 25 interposed between the disc 24 and the transducer 10. The jack 23 is electrically connected to the opposite face of the transducer along a path which includes an insulated conductor 27, the horizontal plate 18 and the tool 11. For a more detailed discussion of the support unit, together with the representative electrical connections to the transducer, reference may be had, for example, to the copending Attwood and Kosrow patent application Serial No. 425,133 entitled "Vibratory Apparatus" filed concurrently herewith, now Patent 3,350,582 granted Oct. 31, 1967.

The power source for the device includes an oscillator circuit indicated generally at 30 (FIGURE 1). The output of the oscillator 30 comprises an alternating current signal of utltrasonic frequency which is fed through an automatic amplitude control circuit 31 and a power amplifier 32 to the jack 22 connected to the transducer element 10. The circuit is completed from the jack 23 through a resistance network 34 to ground.

The current applied to the transducer 10 is fed back through cables 35 and 36 to the automatic amplitude control circuit 31. The circuit 31 is effective to continuously detect any changes in the applied current and to produce a corrective signal in response to such changes. This corrective signal automatically adjusts the voltage across the transducer 10 to ensure that the applied current remains at a predetermined constant value both during and subsequent to the seaming operation. The amplitude of the vibrating surface 14 (FIGURE 3) of the tool 11 is proportional to the transducer current and is held constant irrespective of the degree of loading.

The control circuit also includes an automatic frequency control network 40. The network 40 is supplied with a voltage signal of constant amplitude from the oscillator 30 through a cable 43. In addition, the corrected current signal from the automatic amplitude control circuit 31 is led to the network 40 through the cable 36 and a cable 44. The network 40 includes a phase detection circuit which produces a feedback signal in response to a difference in phase between the applied current and the source voltage. This feedback signal continuously readjusts the frequency of the oscillator to conform to the mechanical resonant frequency of the vibratory tool 11.

The oscillator 30 is of the Hartley type and is arranged to produce an alternating current signal having an ultrasonic frequency which approximates the resonant frequency of the vibratory device and preferably lies within the range of from about 20,000 cycles per second to about 60,000 cycles per second. As best shown in FIGURE 2a, the oscillator is provided with a tank circuit indicated generally at 45 and an oscillator tube 46. The circuit 45 includes an inductance 48, a variable condenser 49 and a series of tuning condensers 50 which are connected in parallel therewith. The effective reactance of the condensers 50 is controlled by a multi-position switch 51 to provide the desired output frequency. The tank circuit 45 is connected through a resistor 53 to the control grid 54 of the oscillator tube 46, the anode 55 of which is supplied with positive D.C. voltage from a source 55a through a resistor 56. The tube 46 comprises a pentode having a grounded supressor grid 57, a screen grid 58 connected to the anode and a cathode 59 connected to a conductor 60 leading to a point intermediate the ends of the inductance 48. Th eoscillator employs feedback between the ground-to-cathode portion of the inductance 48 and the cathode-to-grid portion to produce an output signal in a conductor 61 connected to the common terminal of the inductance 48 and the resistor 53.

The conductor 61 is connected through a line 65 and a condenser 66 to the grid 67 of a triode 68. The triode 68 is arranged in a conventional cathode follower circuit, the output voltage appearing across a resistor 70 connected to the cathode 71 through a resistor 72. This voltage is of relatively constant amplitude and is in phase with the oscillator output voltage, for purposes that will become more fully apparent hereinafter.

The output voltage from the oscillator 30 is fed from the conductor 65 to a line 73 leading to the automatic amplitude control circuit 31 (FIGURE 2). The line 73 is connected through a resistor 74 and a condenser 75 to the control grid 77 of a pentode 78 which serves as a variable amplification stage in the circuit 31. The grid 77 is supplied with a positive D.C. bias voltage through a circuit which extends from a regulated power supply 80, a resistor 81, a potentiometer 82 and a resistor 83 to a junction point 84. The circuit continues from the point 84 to the cathode of a diode rectifier 86, the anode of which is connected through resistors 88 and 89 to the grid 77. The common terminal of the resistors 88 and 89 is connected to ground through a smoothing condenser 90, while the common terminal of the resistor 89 and the grid 77 also is connected to ground through a resistor 91.

The anode 93 of the amplifier tube 78 is supplied with plate voltage through a resistor 94 connected to a positive D.C. source 95, while the cathode 96 of the tube is at ground potential. The output signal from the tube 78 is fed from the anode 93 through a condenser 97 and a conductor 98 to the input of the power amplifier 32. The amplifier 32 may be of conventional construction and accordingly is not shown in detail in the drawings. However, one suitable power amplifier that may be employed is of the type designated as MC75E available commercially from McIntosh Laboratory, Inc., Binghamton, N.Y.

The amplified output signal from the power amplifier 32 appears in a conductor 100 which is in electrically conductive relationship with one face of the vibratory transducer 10. The opposite face of the transducer 10 is connected to ground through a variable resistor 102 and a resistor 103. During the formation of the seam, the resistor 102 is shunted by closing a normally open switch 104, the switch being shown in its closed position in FIGURE 2. The current through the transducer is proportional to the voltage drop across the resistor 103 and is measured by a voltmeter 106. One terminal of the meter 106 is connected through a diode rectifier 108, a potentiometer 109 and a resistor 110 to the common terminal of the resistors 102 and 103, while the opposite terminal of the meter is at ground potential. A second voltmeter 112 is connected between ground and the conductor 100 through a diode rectifier 113, a potentiometer 114 and a resistor 115. By appropriate adjustment of the potentiometers 109 and 114, the meters 106 and 112 are calibrated to provide direct indications of the amplitude of the vibratory device and the applied power, respectively.

The amplitude of the current through the transducer 10, as represented by the voltage across the resistor 103, is detected by a feedback conductor 120 and is applied to the grid 121 of a triode 122 in the automatic amplitude control circuit 31. The cathode 124 of the triode 122 is connected to ground through a parallel circuit comprising a condenser 126 and a resistor 127, while the anode 128 of the triode is supplied with plate voltage through a resistor 129 connected to the D.C. source 95. The output current from the triode 122 is fed from the anode 128 through a condenser 130 to the junction point 84 leading through the rectifier 86 and the resistors 88 and 89 to the grid 77 of the tube 78. This output current appears as a voltage signal across a resistor 131 connected between the point 84 and ground which combines with the voltage from the regulated power supply 80 to establish a variable D.C. bias on the grid 77.

As best shown in FIGURE 2a, the automatic frequency control network 40 comprises a phase detector or discriminator circuit which includes a transformer indicated generally at 135. The primary winding 136 of the transformer 135 is supplied with a signal representative of the current through the transducer 10 (FIGURE 2) by a conductor 137 leading to the common terminal of the transducer and the normally closed switch 104. The arrangement is such that during normal operation the voltage across the winding 136 corresponds to that across the resistor 103 and is in phase with the transducer current.

The secondary winding 140 of the transformer 135 includes a center tap 141 which is supplied with a voltage signal of constant amplitude by a conductor 143. The conductor 143 is connected through a condenser 144 in the oscillator circuit 30 to the output of the cathode follower tube 68. This voltage signal at all times is in phase with the oscillator output voltage in the conductor 65.

One end of the secondary winding 140 is connected to the cathode of a diode rectifier 146, while the anode of the rectifier is connected to a conductor 147. In a similar manner, the opposite end of the winding 140 leads to the cathode of a diode rectifier 148, the anode of which is connected to a conductor 149. A plurality of tuning condensers 150 are connected in parallel across the winding 140 and are provided with a multi-position switch 151 which is effective to tune the winding 140 to the output frequency of the oscillator 30. Also connected across the winding is a variable condenser 152 and a condenser 153. The anodes of the rectifiers 146 and 148 are interconnected by a condenser 155.

The output voltage of the phase detector circuit appears across two series-connected resistors 157 and 158 which are connected between the conductors 147 and 149. The common terminal of these resistors leads through a resistor 159 to the center tap 141. The output voltage is fed through resistors 161 and 162 to the control grid 164 of a reactance tube 165. The tube 165 comprises a pentode having a grounded supressor grid 166 and a screen grid 167 which is connected through a resistor 168 to a positive D.C. source 169. The source 169 also supplies plate voltage to the anode 170 of the tube 165 through a resistor 171. The grid 164 of the tube is coupled through a variable condenser 173 and a line 174 to the conductor 61 in the oscillator 30.

In operation, the oscillator 30 produces an alternating current signal in the conductor 73 at an ultrasonic frequency corresponding to the natural resonant frequency of the electromechanical vibratory device. This signal is fed to the control grid 77 (FIGURE 2) in the amplification stage of the automatic amplitude control circuit 31 and is amplified by the variable amplification tube 78. The output voltage from the tube 78, which illustratively ranges from about two volts to about twelve volts, is amplified by the power amplifier 32 and is led through the conductor 100 to one side of the transducer 10, the circuit being completed from the opposite side of the transducer through the switch 104 and the resistor 103 to ground. The signal applied to the transducer from the amplifier 32 is at a voltage of from about thirty volts to about forty volts, for example, when the device is in an unloaded condition, and at a current which is maintained constant under both unloaded and loaded conditions and illustratively is of the order of about 0.40 ampere. The transducer is effective to vibrate the tool 11 (FIGURE 3) at its resonant frequency with the smaller end 14 of the tool vibrating at an amplitude proportional to the applied current. In the illustrated embodiment, the amplitude of the vibrations is about 0.005 inch.

Upon the insertion of the pieces of material to be joined between the tool 11 and the jaw member 12, the increased resistance to the motion of the tool produces a tendency for the amplitude of its vibrations to decrease. The reduced amplitude tends to produce a corresponding change in the current signal through the transducer 10 and hence lower the voltage across the resistor 103. The decreased signal is detected by the feedback conductor 120 and is amplified by the tube 122 in the automatic amplitude control circuit 31. The R.M.S. plate current of this tube drops accordingly and is effective to reduce the D.C. bias voltage for the variable amplification tube 78 through the circuit including the rectifier 86 and the resistors 88 and 89. As the bias voltage decreases, the amplification of the tube 78 is increased, thereby producing an increased output voltage from the power amplifier 32 which illustratively is of the order of about two hundred volts. The current applied to the vibratory device is thus immediately returned to its initial value to hold the amplitude of the ultrasonic vibrations constant.

In a similar manner, as the pieces of material are removed upon the completion of the seaming operation, the reduced load on the device exhibits a tendency to increase the amplitude of its vibrations and hence raise the amplitude of the applied current. The increased current produces a corresponding increase in the voltage drop across the resistor 103 to raise the potential on the grid 121 of the triode 122. The resulting increase in the D.C. bias voltage on the grid 77 of the pentode 78 lowers the output voltage from the amplifier 32 to thereby hold the applied current constant. The arrangement is such that any change in the current applied to the transducer 10 is immediately detected by the feedback conductor 120 and the triode 122 and is effective to adjust the D.C. bias voltage supplied to the amplification stage of the circuit 31 to continuously correct the applied current. The applied current is maintained at a predetermined constant value to hold the amplitude of the tool vibrations constant under both loaded and unloaded conditions.

As the pieces of material are inserted between the tool 11 and the jaw member 12, the mechanical resonant frequency of the tool exhibits a tendency to vary in response to the increased loading. To maintain the tool in resonance, the automatic frequency control circuit 40 is effective to continuously readjust the output frequency of the oscillator 30. Any change in the resonant frequency of the tool manifests itself as a change in phase between the current applied to the transducer 10 and the output voltage from the oscillator. A voltage signal which is in phase with the applied current is supplied to the primary winding 136 (FIGURE 2a) of the transformer 135 by the conductor 137, while a voltage signal in phase with the oscillator voltage is led to the center tap 141 of the secondary winding 140 through the line 143. The discriminator circuit detects any difference between the phase vectors of these signals and is effective to produce an output signal in response thereto across the resistors 157 and 158.

In the absence of loading, the signals applied to the primary and secondary windings of the transformer 135 have the same phase relationship. Accordingly, the voltages across the resistors 157 and 158 are equal and opposite to each other, and no corrective signal is produced. As the phase of the applied current signal in the primary winding 136 tends to change in response to variations in the resonant frequency of the device, however, an output voltage appears across the resistors 157 and 158 which has a magnitude and polarity corresponding to the magnitude and direction of the phase difference between the applied current and the oscillator voltage. This output voltage is supplied through the resistors 161 and 162 to the control grid 164 of the variable reactance tube 165.

The reactance tube 165 is effectively connected in parallel with the tank circuit 45 in the oscillator 30. The application of the phase detector output signal to the grid 164 varies the conductivity of the tube 165 to produce a corresponding variation in the effective reactance of the tube in the oscillator tank circuit. This variation in reactance is effective to continuously readjust the frequency of the oscillator output to conform to the resonant frequency of the device under all conditions.

The voltage signal applied to the center tap 141 of the secondary winding 140 is of constant amplitude. Similarly, because of the continuous correction of the current through the transducer 10 by the automatic amplitude control circuit 31, the signal applied to the primary winding 136 also remains constant. With this arrangement, any error in the output of the phase detector which might otherwise result from changes in amplitude of the signals applied thereto is eliminated, and the circuit enables the extremely accurate matching of the oscillator output frequency to the resonant frequency of the device.

During the formation of the seam, the vibratory tool 11 preferably is vibrated at maximum amplitude, to provide a rapid and firm bond between the pieces of material being joined. To avoid damaging the tool or its electrical connections, however, the maximum amplitude advantageously is maintained below a preselected level. A preferred range for the amplitude of the tool vibrations lies between about 0.002 inch and 0.006 inch. In cases in which the amplitude is much below this range, the amount of time needed to form the seam is excessive and the seam may prove defective, while amplitudes substantially in excess of 0.006 inch are undesirable because of the potential damage to the equipment.

As the operator of the apparatus inserts the pieces of material between the tool 11 and the jaw member 12, for safety reasons it is desirable to maintain the amplitude of the tool vibrations at a reduced level. Should the operator inadvertently touch the tool as it vibrates at an amplitude of 0.005 inch, for example, burns or other injury may result. Preferably, the control circuit is not shut down completely during the insertion of the material, because as its operation is resumed the automatic current control tube 78, as well as the reactance tube 165 in the automatic frequency control circuit, may exhibit a tendency to hunt in approaching their normal operating ranges, thus causing a delay before operation may be resumed.

To reduce the amplitude of the tool vibrations to an intermediate level, the manually operable switch 104 is opened to thereby place the transducer 10 in series with the variable resistor 102 as well as with the resistor 103. The increased resistance raises the voltage on the grid 121 of the triode 122 to produce a reduction in the output voltage of the power amplifier 32 in a manner similar to that described heretofore. The reduced voltage applied by the amplifier to the transducer drops the applied current to lower the amplitude of the vibrations while at the same time maintaining the applied current sufficient to hold the amplitude control circuit 31 and the frequency control circuit 40 in an active condition. In the illustrated embodiment, the tool amplitude is reduced to approximately 0.002 inch, although in other embodiments the needed amplitude reduction may very substantially from this figure depending upon the various circuit parameters. Upon the closing of the switch 104 after the material has been placed in position, the circuits 31 and 40 are in condition to immediately permit the initiation of the seaming operation.

As best shown in FIGURE 2, the apparatus is provided with a blower unit indicated schematically at 180. The unit 180 includes a fan 181 which is supplied with alternating current from a source 182 and is effective to continuously direct a stream of air across the tool 11 (FIGURE 3) both prior to and during the formation of the seam. This air stream is maintained at a controlled temperature by means of a heating element 184 to hold the temperature of the tool relatively constant. One terminal of the element 184 is connected through a conductor 185 to one side of an alternating current source 186, while the opposite terminal is connected to a conductor 187 leading to the center tap 188 of a potentiometer 189. The potentiometer is connected to the opposite side of the source 186 by a manually controlled switch 190 having a pair of contacts 191 which are maintained in their open position during the formation of the seam.

The switch 190 illustratively may be controlled simultaneously with the switch 104 and is provided with a second pair of contacts 193. The contacts 193 are interposed between the center tap of the potentiometer 82 and a resistor 194 leading to the center tap of a potentiometer 195. As the switch 104 is opened to reduce the amplitude of the tool vibrations, the contacts 193 are closed to enable the control of the reduced amplitude by the potentiometer 195. Upon the closure of the contacts 191, the heating element 184 is connected across the source 186, and the stream of air from the fan 181 is heated to increase the temperature of the tool 11 prior to the formation of the seam. When the switch 104 is closed to vibrate the tool at its maximum amplitude, the contacts 191 are opened to disconnect the heating element and thereby enable the fan to direct a stream of cooling air across the tool. The blower unit thus compensates for the normal tendency of the temperature of the tool to vary in response to changes in amplitude, and the tool temperature is maintained substantially constant at all times. As a result, the adverse effect of variations in temperature on the resonant frequency of the tool, which might otherwise increase the possibility of a mismatch between the resonant frequency and the frequency of the oscillator 30, is further reduced. For a more detailed discussion of a representative blower unit useful in connection with the apparatus, reference may be had, for example, to the copending Attwood and Kosrow patent application Serial No. 425,231 entitled "Method and Apparatus for Forming Ultrasonic Seals" filed concurrently herewith, now Patent 3,405,024, granted Oct. 8, 1968.

Although in the illustrated embodiment of the invention certain of the control elements have been shown and described as comprising vacuum tubes, it of course will be apparent that transistors or other electron discharge devices may be substituted therefor in an equivalent circuit without departing from the spirit or scope of the invention as defined by the appended claims.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a control circuit for an electromechanical vibratory device, in combination, a source of alternating current, circuit means for applying current from said source to said electromechanical vibratory device, to vibrate the same, the amplitude of the vibrations tending to vary as mechanical loading is applied to said device to produce variations in the applied current, and detection means including a continuous inductance-free conductive path from said device to said circuit means for detecting the variations in said applied current produced by said mechanical loading, said circuit means continuously correcting said applied current in response to the detected variations to maintain said current at a predetermined constant value, to thereby hold the amplitude of said vibrations constant as said loading is applied.

2. In a control circuit for an electromechanical vibratory device the amplitude of which exhibits a tendency to vary when loading is applied, in combination, a source of alternating current of ultrasonic frequency, circuit means for applying current from said source to said electromechanical vibratory device, to vibrate the same at said frequency and at an amplitude proportional to the applied current, said amplitude and said applied current tending to vary as mechanical loading is applied to said device, feedback means including an inductance-free interconnection between said device and said circuit means for detecting changes in said applied current produced by said loading, and only a single pair of electrical connections leading to said vibratory device for coupling both said circuit means and said feedback means thereto, said circuit means continuously correcting said applied current in response to the detected changes to maintain said current at a predetermined constant value, to thereby hold the amplitude of said device constant as said loading is applied.

3. In a control circuit for an electromechanical vibratory device having a natural resonant frequency, the amplitude of said device exhibiting a tendency to vary when loading is applied, in combination, a source of alternating current, circuit means including an amplification stage for applying amplified current from said source to said electromechanical vibratory device, to vibrate the same at an amplitude proportional to the applied current and at its natural resonant frequency, said amplitude and said applied current tending to vary as mechanical loading is applied to said device, said circuit means including means for applying a D.C. bias voltage to said amplification stage, and means responsive to the variations in said applied current produced by said mechanical loading for adjusting said D.C. bias voltage to continuously correct said applied current to maintain said current at a predetermined constant value, to thereby hold the amplitude of said device constant as said loading is applied.

4. In a control circuit for an electromechanical vibratory device the amplitude of which exhibits a tendency to vary when loading is applied, in combination, a source of alternating current, circuit means for applying current from said source to said electromechanical vibratory device, to vibrate the same, the amplitude of the vibrations tending to vary as mechanical loading is applied to said device to produce variations in the applied current, feedback means interconnecting said device and said circuit means for detecting the variations in said applied current produced by said mechanical loading, said circuit means continuously correcting said applied current in response to the detected variations to maintain said current at a predetermined constant value, to thereby hold the amplitude of said vibrations constant as said loading is applied, and manually operable means connected to said circuit means for reducing said current to an intermediate value below said predetermined value.

5. In a control circuit for an electromechanical vibratory device, in combination, a source of alternating current, circuit means for applying current from said source to said electromechanical vibratory device, to vibrate the same, said device having a resonant frequency which exhibits a tendency to vary as loading is applied to produce a difference in phase between the applied current and the voltage of said source, the applied current also tending to vary as said loading is applied, detection means supplied with said applied current and said source voltage for detecting a phase difference therebetween, said circuit means including means for maintaining said applied current supplied to said detection means at a constant amplitude, and means coupled to said detection means for continuously readjusting the frequency of said source to conform to said resonant frequency.

6. In a control circuit for an electromechanical vibratory device, in combination, a source of alternating current, means for applying current from said source to said electromechanical vibratory device, to vibrate the same, said device having a resonant frequency which exhibits a tendency to vary as loading is applied to produce a difference in phase between the applied current and the voltage of said source, detection means connected to said device for producing an output signal in response to a phase difference between said current and said voltage, means for maintaining both said current and said voltage applied to said detection means at constant amplitudes, and means coupled to said detection means and responsive to said output signal for continuously readjusting the frequency of said source to conform to said resonant frequency.

7. In a control circuit for an electromechanical vibratory device, in combination, oscillator means including a tuned circuit for generating an alternating current of ultrasonic frequency, circuit means for applying current from said oscillator means to said electromechanical vibratory device, to vibrate the same, said device having a resonant frequency which exhibits a tendency to vary as loading is applied to produce a difference in phase between the applied current and the output voltage of said oscillator means, detection means connected to said device for producing a feedback signal in response to a phase difference between said current and said voltage, means coupled to said detection means for maintaining both said current and said voltage at constant amplitudes, and variable reactance means connected to said tuned circuit and responsive to said feedback signal for varying the reactance of said tuned circuit, to thereby readjust the frequency of said oscillator means to conform to said resonant frequency.

8. In a control circuit of the character set forth in claim 7, in combination, said circuit means including means for reducing the amplitude of the current applied to said vibratory device to an intermediate value below said constant amplitude, said intermediate value being sufficient to enable said variable reactance means to continue to vary the reactance of said tuned circuit.

9. A control circuit for an electromechanical vibratory device having a mechanical resonant frequency, said circuit comprising a source of alternating current, circuit means for applying current from said source to said electromechanical vibratory device, to vibrate the same at an amplitude proportional to the applied current and at its mechanical resonant frequency, said amplitude and said applied current tending to vary as mechanical loading is applied to said device, said mechanical resonant frequency also tending to vary as said loading is applied to produce a difference in phase between said applied current and the source voltage, first detection means coupled to said device for detecting changes in said applied current produced by said mechanical loading, said circuit means correcting said applied current in response to the detected changes to maintain said current at a predetermined constant value, to thereby hold the amplitude of said device constant as said loading is applied, and second detection means connected to said device and responsive to a difference in phase between said applied current and said source voltage for readjusting the frequency of said source to conform to said mechanical resonant frequency.

10. A control circuit for an electromechanical vibratory device the amplitude and resonant frequency of which exhibit a tendency to vary when loading is applied, said circuit comprising a source of alternating current, circuit means for applying alternating current from said source to said electromechanical vibratory device, to vibrate the same, the amplitude of the vibrations tending to vary as mechanical loading is applied to said device to produce variations in the applied current, said resonant frequency also tending to vary as said loading is applied to produce a difference in phase between said applied current and the source voltage, first detection means interconnecting said device and said circuit means for detecting the variations in said applied current produced by said mechanical loading, said circuit means continuously correcting said applied current in response to the detected variations to maintain said current at a predetermined constant value, to thereby hold the amplitude of said vibrations constant as said loading is applied, second detection means supplied with said applied current and said source voltage for detecting a difference in phase therebetween, only a single pair of electrical connections leading to said vibratory device for coupling both said circuit means and said first and second detection means thereto, and means coupled to said second detection means for continuously readjusting the frequency of said source to conform to said resonant frequency.

11. A control circuit of the character set forth in claim 10, in which the amplitude of said vibrations is held at a constant level within the range of from about 0.002 inch to about 0.006 inch.

12. A control circuit of the character set forth in claim 10, in which the frequency of said source is maintained within the range of from about 20,000 cycles per second to about 60,000 cycles per second.

13. A control circuit for an electromechanical vibratory device the amplitude and resonant frequency of which exhibit a tendency to vary when loading is applied, said circuit comprising oscillator means for generating an alternating current, circuit means including an amplification stage for applying amplified current from said oscillator means to said electromechanical vibratory device, to vibrate the same at an amplitude proportional to the applied current and at its resonant frequency, said amplitude and said applied current tending to vary as mechanical loading is applied to said device, said resonant frequency also tending to vary as said loading is applied to produce a difference in phase between said applied current and the output voltage of said oscillator means, said circuit means including means for applying a D.C. bias voltage to said amplification stage, first detection means coupled to said device and to said last-mentioned means for detecting changes in said applied current produced by said mechanical loading, said circuit means adjusting said D.C. bias voltage in response to the detected changes to continuously correct said applied current to maintain said current at a predetermined constant value, to thereby hold the amplitude of said device constant as said loading is applied, and second detection means connected to said device and responsive to a difference in phase between said applied current and said oscillator output voltage for continuously readjusting the frequency of said output voltage to conform to said resonant frequency.

14. A control circuit for an electromechanical vibratory device the amplitude and resonant frequency of which exhibit a tendency to vary when loading is applied, said circuit comprising oscillator means including a tuned circuit for generating an alternating current, circuit means having an amplification stage for applying amplified current from said oscillating means to said electromechanical vibratory device, to vibrate the same at an amplitude proportional to the applied current and at its resonant frequency, said amplitude and said applied current tending to vary as loading is aplied to said device, said resonant frequency also tending to vary as said loading is applied to produce a difference in phase between said applied current and the output voltage of said oscillator means, said circuit means including means for applying a D.C. bias voltage to said amplification stage, first detection means coupled to said device and to the bias applying means for detecting changes in said applied current, said circuit means adjusting said D.C. bias voltage in response to the detected changes to continuously correct said applied current to maintain said current at a predetermined constant value, to thereby hold the amplitude of said device constant as said loading is applied, second detection means connected to said device and responsive to a difference in phase between said applied current and said oscillator output voltage for producing a feedback signal, means connected to said tuned circuit and operable in response to said feedback signal for varying the reactance of said tuned circuit to continuously readjust the frequency of said oscillator means to conform to said resonant frequency, and manually operable means coupled to said circuit means for reducing said applied current to an intermediate value below said predetermined value.

15. A control circuit of the character set forth in claim 14, in which said bias applying means includes rectifier means connected to the input of said amplification stage.

16. In apparatus for joining pieces of material, in combination, an ultrasonic sealing tool having an amplitude of vibration which exhibits a tendency to vary when the material to be joined is brought into contact therewith, a source of alternating current of ultrasonic frequency, circuit means for applying current from said source to said ultrasonic sealing tool, to vibrate the same at said ultrasonic frequency and at an amplitude of vibration proportional to the applied current, the amplitude of said applied current tending to vary in accordance with the variations in amplitude of said tool as said material comes in contact therewith, and feedback means including an inductance-free and capacitance-free interconnection between said tool and said circuit means for detecting changes in the amplitude of said applied current produced by the bringing of said material into contact with said tool, said circuit means continuously correcting the amplitude of said applied current in response to the detected changes to maintain the amplitude of said current at a predetermined constant value, to thereby hold the amplitude of vibration of said tool constant as said material is brought in contact therewith.

17. In apparatus for joining pieces of material, in combination, an ultrasonic sealing tool having an amplitude of vibration which exhibits a tendency to vary when the material to be joined is brought into contact therewith, a source of alternating current of ultrasonic frequency, circuit means for applying current from said source to said ultrasonic sealing tool, to vibrate the same at said ultrasonic frequency and at an amplitude of vibration proportional to the applied current, the amplitude of said applied current tending to vary in accordance with the variations in amplitude of said tool as said material comes in contact therewith, feedback means including an inductance-free and capacitance-free interconnection between said tool and said circuit means for detecting changes in the amplitude of said applied current produced by the bringing of said material into contact with said tool, and only a single pair of electrical connections leading to said tool for coupling both said circuit means and said feedback means thereto, said circuit means continuously correcting the amplitude of said applied current in response to the detected changes to maintain the amplitude of said current at a predetermined constant value, to thereby hold the amplitude of vibration of said tool constant as said material is brought in contact therewith.

18. Apparatus for joining pieces of material comprising, in combination, an ultrasonic sealing tool having an amplitude of vibration and a resonant frequency which exhibit a tendency to vary when the material to be joined is brought into contact therewith, a source of alternating current, circuit means for applying current from said source to said ultrasonic sealing tool, to vibrate the same at said ultrasonic frequency and at an amplitude of vibration proportional to the applied current, the amplitude of said applied current tending to vary in accordance with the variations in amplitude of said tool as said material comes in contact therewith, said resonant frequency also tending to vary as said material contacts said tool to produce a difference in phase between said applied current and the voltage of said source, first detection means interconnecting said tool and said circuit means for detecting changes in the amplitude of said applied current produced by the bringing of said material into contact with said tool, said circuit means continuously correcting the amplitude of said applied current in response to the detected changes to maintain the amplitude of said current at a predetermined constant value, to thereby hold the amplitude of vibration of said tool constant as said material is brought in contact therewith, second detection means supplied with said constant amplitude current and with said source voltage for detecting a difference in phase therebetween, and means coupled to said second detection means for continuously readjusting the frequency of said source to conform to said resonant frequency.

References Cited

UNITED STATES PATENTS

| | | | |
|---|---|---|---|
| 3,121,534 | 2/1964 | Wilson | 318—118 XR |
| 2,995,689 | 8/1961 | Scarpa | 318—118 XR |
| 2,498,760 | 2/1950 | Kreithen. | |
| 2,742,035 | 4/1956 | Hancock et al. | 318—127 X |
| 2,752,512 | 6/1956 | Sarratt | 318—116 |
| 2,812,485 | 11/1957 | Schieber | 318—448 |
| 2,872,578 | 2/1959 | Kaplan et al. | 318—118 X |
| 2,878,886 | 3/1959 | Overton | 318—8.1 X |
| 2,917,691 | 12/1959 | DePrisco et al. | 310—118 |

J. D. MILLER, *Primary Examiner.*

U.S. Cl. X.R.

310—8, 8.1; 318—116, 118